April 14, 1931. R. E. OLSON ET AL 1,800,315
DOUGH CUTTER
Filed March 8, 1930 2 Sheets-Sheet 1
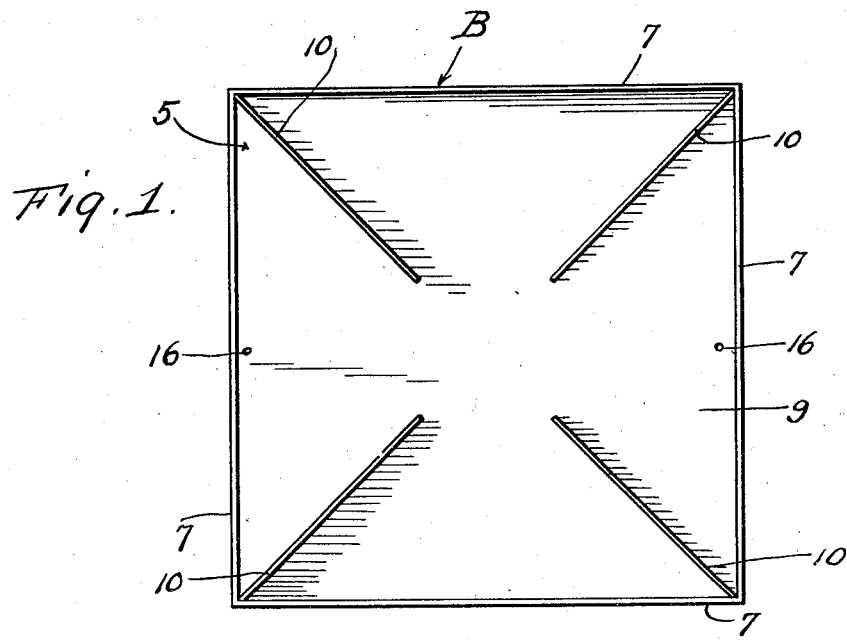
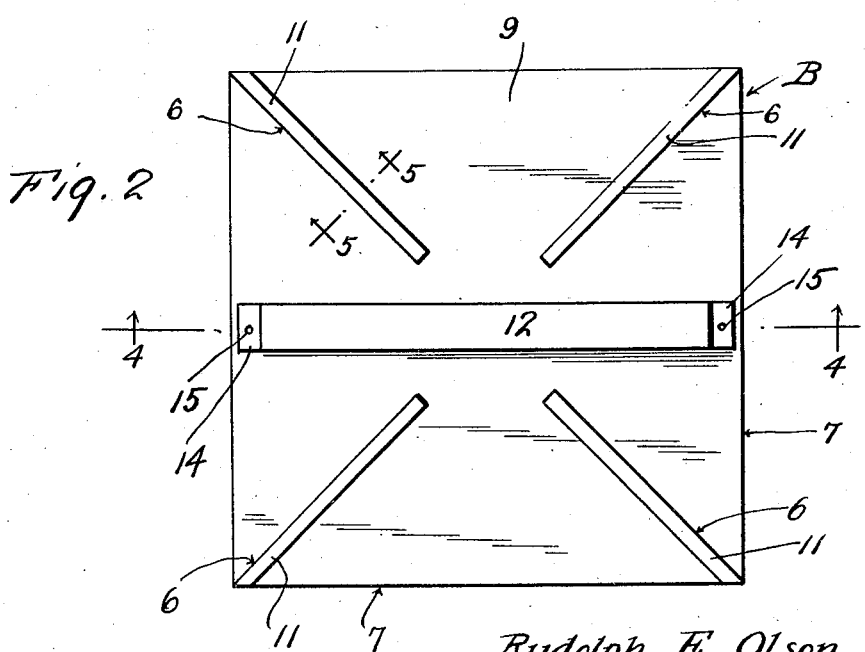
Inventors
Rudolph E. Olson
Nancy V. Olson
By Clarence A. O'Brien
Attorney April 14, 1931. R. E. OLSON ET AL 1,800,315
DOUGH CUTTER
Filed March 8, 1930 2 Sheets-Sheet 2
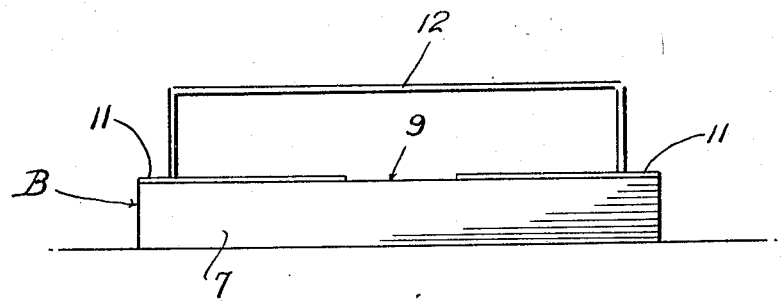
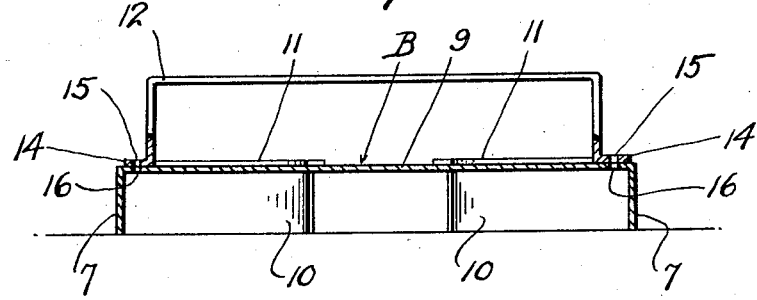
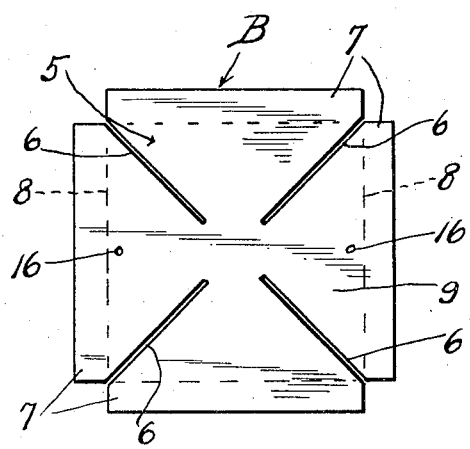
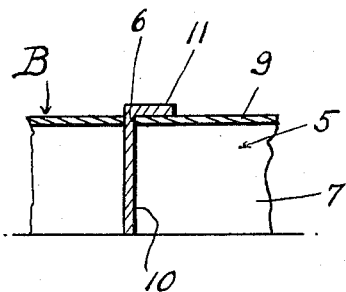
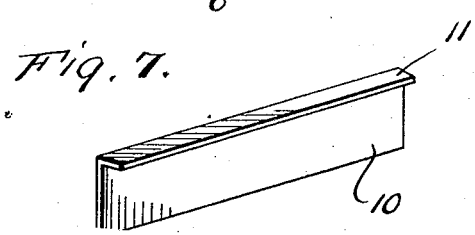
Inventors
*Rudolph E. Olson*
*Nancy V. Olson*
By *Clarence A. O'Brien*
Attorney Patented Apr. 14, 1931

1,800,315

UNITED STATES PATENT OFFICE

RUDOLPH E. OLSON AND NANCY V. OLSON, OF BRYANT, SOUTH DAKOTA

DOUGH CUTTER

Application filed March 8, 1930. Serial No. 434,331.

The present invention relates to a dough cutter and has for its prime object to provide means whereby a sheet of dough may be cut in such a manner as to provide a square sheet of dough on the center of which may be placed fruit, the sheet being cut to provide foldable sections which may be folded over the fruit to result in a star like confection.

Another very important object of the invention resides in the provision of a device of this nature which is exceedingly simple in its construction, inexpensive to manufacture, strong and durable, thoroughly efficient and reliable in use and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a bottom plan view of the device embodying the features of our invention, Figure 2 is a top plan view thereof, Figure 3 is a side elevation thereof, Figure 4 is a vertical sectional view therethrough taken substantially on the line 4—4 of Figure 2, Figure 5 is a detail section taken substantially on the line 5—5 of Figure 2, Figure 6 is a plan view of the blank from which the back is formed, and Figure 7 is a perspective view of one of the blades.

Referring to the drawing in detail it will be seen that the device which is denoted generally by the letter B is formed from a blank of sheet metal as illustrated in Figure 6 substantially square in formation having its corners cut out as is indicated at 5 and slots 6 formed extending inwardly from the corners toward the center and terminating a distance from the center.

Cutting flanges 7 are formed by bending the sheet along the dotted lines 8 thereby leaving the top 9 which is square in formation. The end edges of the flanges may be soldered together, spot welded or otherwise secured. Elongated blades 10 are inserted down through the slots 6 and have right angularly extending flanges 11 at their top ends secured in any suitable manner to the top surface of the top 9 of the back B.

A handle 12 of inverted U-shaped formation has its ends provided with outwardly directed feet 14 secured to the top 9 formed with apertures 15 registering with apertures 16 in the top to allow the escape of air as the device is being used. In using the device the operator merely grasps the handle 12 and pushes the cutting edges of the flanges 7 and the blades 10 into the sheet of dough thereby cutting out a square having slots or slits extending inwardly from the corners thereof. The latch or lift divides the square into a plurality of triangular shaped sections arranged in a circle about a common center and pointing inwardly of the circle. These triangular sections are spaced laterally of each other by reason of the slot and are united only at their inner ends to provide a center section upon which fruit or other confection filling may be placed. Subsequent to the placing of the filling, the triangular sections are successively folded upon themselves to dispose an outer corner of each over upon the loose bearing section whereby to provide a star shaped design.

The folded in corners of the triangular section relatively overlap each other and provide an outer covering or crust for the filling, being integrally united in a solidified structure by the baking of the dough.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

A device of the class described comprising a square plate having a depending peripheral flange and slots extending inwardly from the corners thereof and terminating a distance from the center, blades extending through the slot downwardly and having supporting flanges secured to the top surface of the plate.

In testimony whereof we affix our signatures.

RUDOLPH E. OLSON.
NANCY V. OLSON.